United States Patent [19]

Althouse

[11] Patent Number: 5,568,186
[45] Date of Patent: Oct. 22, 1996

[54] FOCAL PLANE FILTERED MULTISPECTRAL MULTIDETECTOR IMAGER

[75] Inventor: Mark L. G. Althouse, Bel Air, Md.

[73] Assignee: The United States of America as represented by the Secretary of the Army, Washington, D.C.

[21] Appl. No.: 365,374

[22] Filed: Dec. 27, 1994

Related U.S. Application Data

[63] Continuation of Ser. No. 151,679, Nov. 15, 1993, abandoned.

[51] Int. Cl.$^6$ ............................................. H04N 5/33
[52] U.S. Cl. ..................... 348/33; 348/164; 250/332; 250/339.02; 250/339.13; 250/347
[58] Field of Search ......................... 348/164, 25, 32, 348/33; 250/339.02, 339.12, 339.13, 347, 352, 332; 356/320, 437; 340/632, 634; H04N 5/33

[56] References Cited

U.S. PATENT DOCUMENTS

| | | | |
|---|---|---|---|
| 4,285,007 | 8/1981 | Nakano et al. | 348/273 |
| 4,658,140 | 4/1987 | Roll et al. | 250/347 |
| 4,678,332 | 7/1987 | Rock et al. | 356/328 |
| 4,725,733 | 2/1988 | Horman et al. | 250/339 |
| 4,783,593 | 11/1988 | Noble | 250/352 |
| 4,940,895 | 7/1990 | Mansfield | 250/332 |
| 5,075,550 | 12/1991 | Miller et al. | 250/338.5 |
| 5,164,858 | 11/1992 | Aguilera et al. | 359/587 |
| 5,260,575 | 11/1993 | Iwasaki et al. | 250/352 |
| 5,306,913 | 4/1994 | Noack et al. | 250/338.5 |

*Primary Examiner*—John K. Peng
*Assistant Examiner*—Chris Grant
*Attorney, Agent, or Firm*—Ulysses John Biffoni; Michael C. Sachs

[57] ABSTRACT

A dewar cooled piezo electric activated beam splitter permits a filtered two dimensional multispectral multidetector staring imager to operate as a target acquisition and recognition device as well as a detector and classifier of unknown chemical vapors or other targets with spectral fingerprint.

18 Claims, 2 Drawing Sheets

5,568,186

1

FOCAL PLANE FILTERED MULTISPECTRAL MULTIDETECTOR IMAGER

GOVERNMENT INTEREST

The invention disclosed herein may be manufactured, used and licensed by or for the United States Government.

This application is a continuation of Ser. No. 151,679 filed Nov. 15, 1993, now abandoned.

BACKGROUND OF THE INVENTION

The use of chemicals as a potential threat in modern warfare has generated a need to detect the presence of these materials as quickly as possible so that military personnel can take necessary precautionary measures. It is known that all threat and most pollutant chemical vapors have absorption features in the 8–12 micron region. Since prior art standard Thermal Imagers (TIs) view this whole wavelength region at once, a vapor signature would represent only a small amount of energy and be difficult to detect. In addition, all vapors that absorb on the 8–12 micron wavelength band would yield the same type of image data making it very difficult to differentiate one vapor from another. In order to discriminate chemical species one must divide the 8–12 micron band into a large number of small regions so that these may then be analyzed relative to one another. Presently the Thermal Imagers that exist in the armed forces are used for tactical target acquisition, tracking and fire control and are known as Forward Looking Infrared (FLIRs). It would be a great financial and logistical advantage if these prior art FLIRs could be used as an adjunct chemical vapor detection sensor.

The problem with prior art Thermal Imagers is division of the 8–12 micron band into smaller parts can only be done with filters or a dispersion optic. Both of these approaches are not satisfactory because they both have transmission losses. In the case of filters, the pass band may be as narrow as ½ micron and still yield 80% transmission. Filters much narrower than ½ micron quickly degrade in peak transmission. Under these conditions the filter would decrease the total energy incident on the array detector, thus lowering overall sensitivity.

There are two problems with using standard band pass filters. Firstly, in order to divide the 8–12 micron band fully into ½ micron wide segments would require 8 individual filters These individual filters need to be mechanically rotated into the field of view sequentially to obtain spectral data, which is difficult to do, or there would have to be 8 to 10 single band filtered detectors and some method of scanning the field of view over each. The second problem with using standard band pass filters is that the prior art detector now views a "hot" filter element which is opaque over much of the sensitivity range of the detector. This is a problem particularly if the scene background is colder than the filter, it would result in considerable loss of sensitivity. The problem specific to tactical military FLIRs is the requirement for excellent spatial resolution for target acquisition and recognition. It is very important that the image quality and operational availability of the tactical sensor not be comprised in any way by the addition of further missions or hardware.

SUMMARY OF THE INVENTION

The present invention relates to a focal plane filtered multispectral multidetector imager which can be used for target acquisition and recognition and for the ability to detect and classify chemical vapors or any target with a spectral signature. The invention uses two array detectors, which are two-dimensional N×N pixel focal plane array detectors capable of instantaneously detecting the entire image on the image plane. The image plane is alternated between the two array detectors by a piezo-electrically driven beam switcher, each array detector producing an image which is transformed into a video output. The first array detector is unfiltered, providing a standard thermal image. The second array detector is filtered at the focal plane by a matrix or mosaic filter and provides the multispectral image.

An object of the present invention is to permit the modification of a Thermal Imager to deliver both its standard image and a filtered image simultaneously.

Another object of the present invention is to permit the modification of a Thermal Imager which does not degrade the standard image in any way.

Another object of the present invention is to provide for a Thermal Imager wherein the filtered image will have the highest sensitivity obtainable for the given detector array and filter bands.

A further object of the present invention is to provide a focal plane filtered multispectral multidetector imager wherein the use of both filtered and unfiltered images will allow sufficient spectral characterization of the viewed scene to detect and classic chemical vapor clouds or any target with a spectral signature.

For a better understanding of the present invention, together with other and further objects thereof, reference is made to the following description taken in connection with the accompanying drawings.

BRIEF DESCRIPTION OF THE DRAWINGS

Throughout the following description like numerals are used to designate like parts of the drawings.

DESCRIPTION OF THE PREFERRED EMBODIMENT

Figure 1:
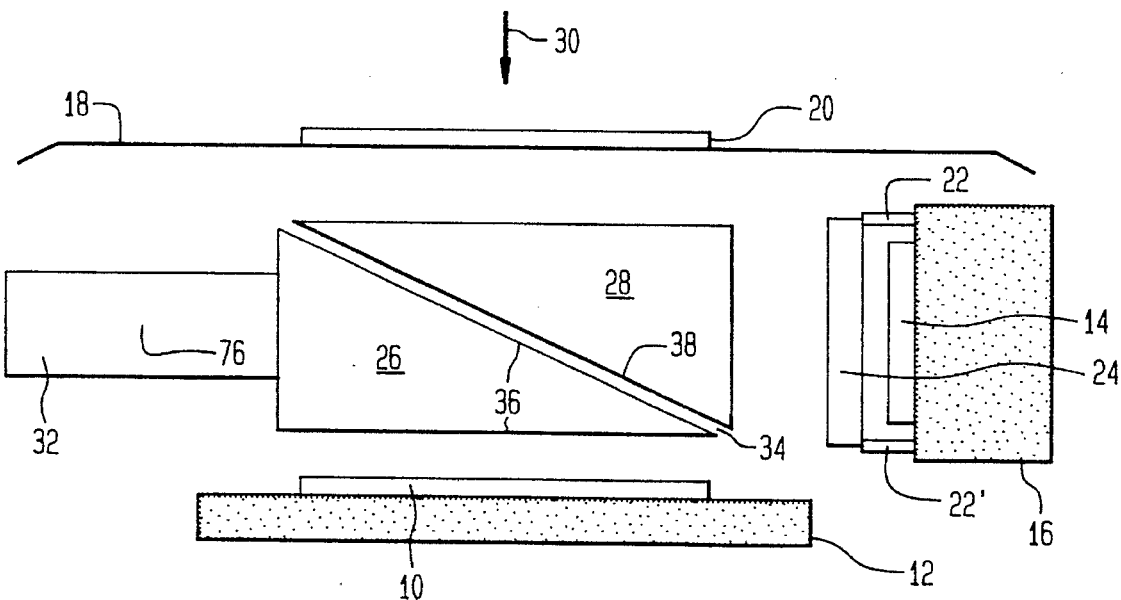
FIG. 1 is a partial schematic view of the multispectral dual detector staring array imager dewar layout.

Referring now to FIG. 1 the imager comprises a first focal plane array detector 10 which is operatively disposed on top of a first detector substrate 12. A second focal plane array detector 14 is operatively disposed on top of a second detector substrate 16. The detector substrates 12 and 16 serve as mounting structure and as an electrical interconnection path for the detector arrays 10 and 14. The first array detector 10 is used for normal target acquisition, recognition, and detection. The second array detector 14 is used for chemical detection. The first array detector 10 and the second array detector 14 are positioned at right angles with respect to each other and located in a dewar flask, not shown, which has a dewar will 18 with a dewar window 20 therein. Filter mounting elements 22 and 22' support a two dimensional spectral filter array 24 which will be described in more detail hereinafter. A beam splitter comprising a first prism 26 and a second prism 28 can direct the optical path shown by arrow 30 to either detector 10 or 14 depending upon their physical arrangement. A piezo electric: transducer 32 adjusts the air gap 34 to produce either reflection or transmission at the prism diagonal surfaces 36 and 38 of prisms 26 and 28 respectively. Since there is no scanning necessary to produce an image, from the outputs of focal plane detectors 10 and 14, there is sufficient dwell time for each array to develop a signal at a normal 30 Hertz video frame rate.

Figure 2:
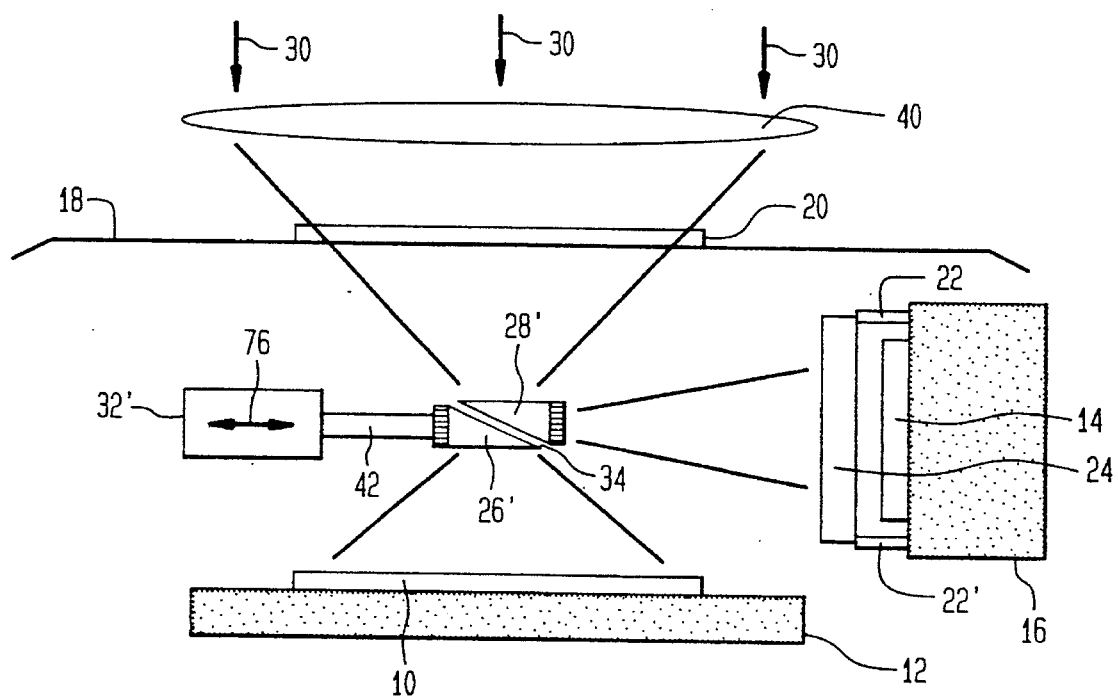
FIG. 2 is a partial schematic view of the filtered multispectral multidetector imager with the beam switches at an intermediate focus.

Referring now to FIG. 2, if a lens 40 is placed in front of dewar window 20, the piezo electric transducer 32' and beam switchers 26' and 28' can be made physically quite small by placing them at an intermediate focus. Transducer extension member 42 connects piezo electric transducer 32' motion to the small first prism 26'.

Figure 3:
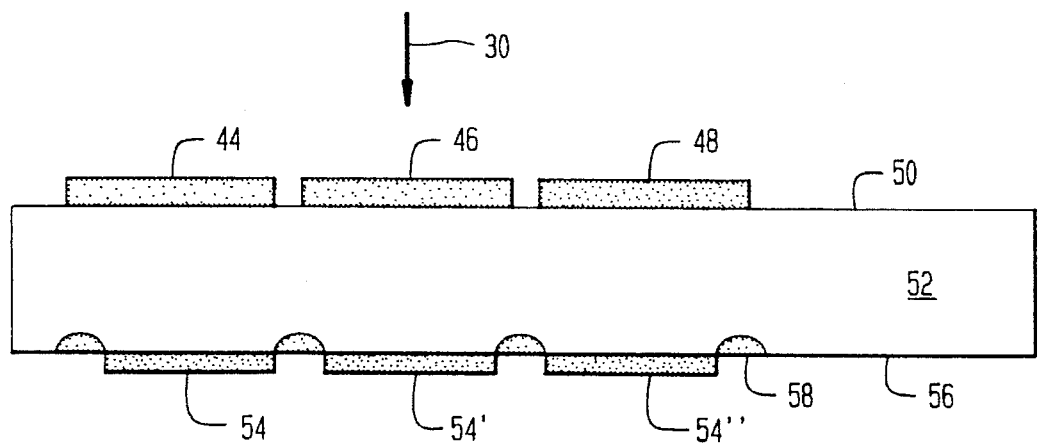
FIG. 3 is a schematic end view of a detector filter array illuminated from the rear.

Referring now to FIG. 3, the filter array may have a rear illumination filter layout. For applications involving infrared wavelength, the process of depositing filters on the detector elements themselves may affect the detectors at the high temperatures involved. To avoid this problem patches 44, 46 and 48 having different pass bands are deposited on the rear surface 50 of a transparent detector substrate 52. Detector elements not shown, in other wavelengths, not as temperature sensitive in the dopant migration rates (e.g. silicon) may be front surface 56 coated. The rear surface 50 coating will be successful due to the insulating effect of the transparent substrate 52 on the detector elements 54. The substrate 52 may be bonded to a mesh substrate (detector face down) for electrical connections and mechanical mounting. Detector array 54, 54', and 54" as shown is illuminated from the rear, permitting the filter array 44, 46, and 48 to be deposited directly onto the back surface 50 of the transparent substrate 52 without affecting the characteristics of the detector elements 54, 54', 54" during the high temperature vapor deposition process. The detector elements 54, 54' and 54" may be either etched, grown, or bumped onto the substrate, by methods well known in the art, and are separated from each other by doped channels 58.

Figure 5:
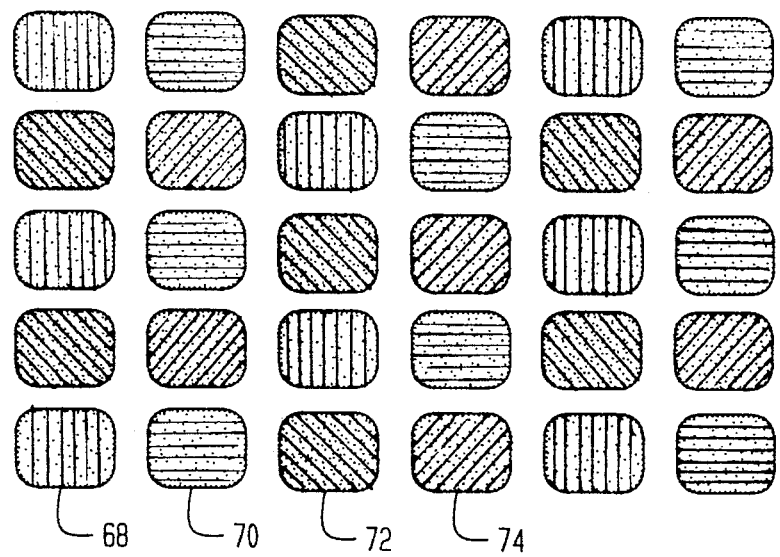
FIG. 5 is an alternate schematic view of a two dimensional multispectral filter mosaic for a focal plane array detector.
Figure 4:
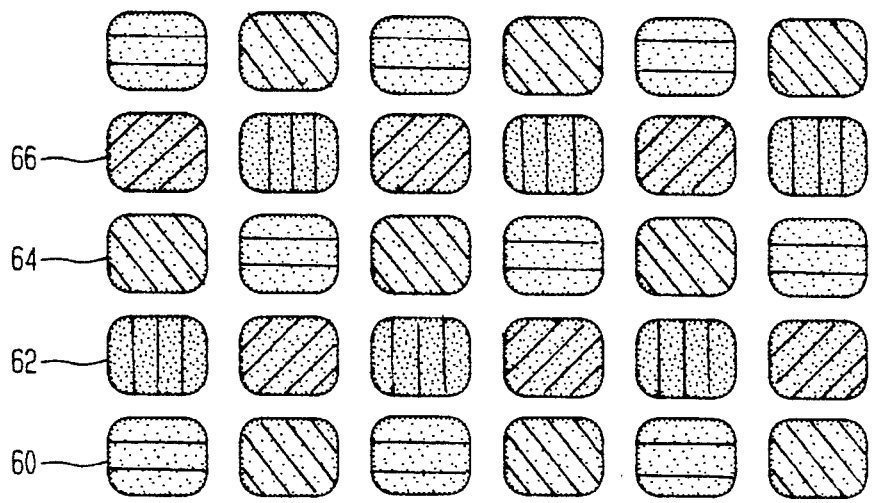
FIG. 4 is a schematic view of a two dimensional multispectral filter array for a focal plane array detector.

Referring now to FIGS. 4 and 5, the two dimensional filter mosaics show two possible arrangements of four distinct filter pass bands 60, 62, 64, 66 and 68, 70, 72 and 74 respectively in a two dimension array which provides adequate spectral coverage. In each case every pass band has the other three pass bands adjacent to it and no filter patches of the same pass band are adjacent. An image has a high degree of spatial correlation. Based upon the statistical history of the correlation for a particular family of scenes, adjacent different pass band signals may be compared for digression from the norms. Digression would reveal objects with spectral features in that portion of the image.

There exist optimal covering patterns for any number of discrete filter pass bands. The complexity of the spectral features being sought will determine the number of filter bands required. Filter patches as small as 50 by 50 microns have been fabricated and arranged in a two dimensional array using processes standard in the semiconductor fabrication industry. However, this is the first known use of semiconductor masking with vapor deposition of optical materials.

In operation referring again to the two detector two dimensional focal plane array imaging system of FIG. 1. Each of the detector arrays have paths which are optically identical. One is the standard detector array 10, the second detector array 14 is similar to the first array but has an optical filter array such as shown in either FIG. 4 or 5 in front of it. The purpose and use of the filtered detector array is that of a staring imager, with no scanning of the field of view required to form an image. Key to this arrangement is the piezo electrically driven beam switcher 26. To form two image streams at the 30 HZ video rate, the image beam must be switched quickly enough to permit each detector array 10 and 14 enough dwell time to generate a signal of full sensitivity. Charges are generated within the detector elements 10 and 14 during the time the array views the scene. When the beam is switched, charges are latched and then swept out to form an analog image signal during the dark time when the other detector is exposed to the scene. Additionally, the beam switcher must function within the cooled detector dewar and not generate heat or appreciable vibration. The beam switcher works on the principle of frustrated total internal reflection. Prism 26 moves reciprocally in the direction indicated by arrows 76 and prism 28 is fixed. Prism 28 acts as in a normal fashion to reflect the beam 30 from its diagonal face 38 to the filtered detector 14. As the beam reflects from the diagonal face 38 of prism 28, it creates an evanescent wave which extends several wavelengths beyond the crystal-air interface. As long as this wave sees only air, the reflection process is total. With smooth surface ($\lambda/20$ or better surface roughness) and good alignment, the piezo actuator 32 can move prism 26 to close the diagonal air gap 34 to a width of $\lambda/5$ or smaller. At a depth of $\lambda/5$ the evanescent wave from prism 28 extends strongly into prism 26 and generates an image beam there which propagates as if prisms 26 and 28 were a cube. Thus the reflection within prism 28 is frustrated.

Piezo actuators can function at the speed and temperature required and since the total movement will be no more than 100 microns, no appreciable vibration will be created. Additionally, the heat generated by the piezo actuator 32 is small and within the capacity of the dewar coolers on the market. The interior of the dewar wall 18 is evacuated and, operates at 80 degrees Kelvin. These conditions will not optically alter the operation of the beam switcher. The aforementioned operational comments apply equally to the FIG. 2 beam switcher which operates at or near intermediate focus.

While a specific embodiment of the invention has been shown and described in detail to illustrate the application of the principles of the invention, it will be understood that the invention may be embodied otherwise without departing from such principles. The invention may generally be applied to the detection of targets with spectral signatures. Examples of targets with spectral signature are well known and include environmental vapor hazards and vapor leaks at industrial sites. Although the specific embodiment describes the application to chemical vapor detection, it is intended that the invention cover all alternatives, modifications, and equivalents as may be included within the spirit and scope of the invention defined in the appended claims.

What is claimed is:

1. A filtered multispectral multidetector imager, which comprises:

(a) first prism means providing a first optical path for radiation therethrough;

(b) second prism means proximately positioned adjacent to said first prism means for providing a second optical path for radiation therethrough, said first prism means and said second prism means having an air gap therebetween;

(c) piezo electric transducer means operatively connected to said first prism means for reciprocally opening and closing said air gap intermediate said first and second prism means and thereby switching between said first optical path and said second optical path;

(d) first array detector means in alignment with said first prism means for detecting radiation passing through said first prism means;

(f) first substrate means for supporting said first array detector means;

(g) second array detector means for detecting radiation reflected by said second prism means;

(h) second substrate means for supporting said second array detector means, said second substrate means having a front and a rear surface; and (i) spectral filter array means operatively supported on said second substrate means intermediate said second prism means and said second detector means for providing a plurality of band pass filters for generation of a single frame multispectral image.

2. The multispectral multidetector imager of claim 1, further comprising:

(a) enclosure means having an interior chamber, said enclosure means providing protection from stray ambient radiation and having aperture means so that a field of radiation can pass therethrough; and (b) wherein said first array detector means, said first substrate means, said second array detector means, and said second substrate means are disposed within said interior chamber of said enclosure means so that they are only exposed to the field of radiation passing through said aperture means.

3. The multispectral multidetector imager of claim 2, wherein said first prism means, said second prism means, and said piezo electric transducer means are also disposed within said interior chamber of said enclosure means.

4. The multispectral multidetector imager of claim 3, wherein said enclosure means comprises dewar means for maintaining said imager at cryogenic temperatures.

5. A multispectral multidetector imager as recited in claim 4, wherein said aperture means includes a lens positioned in front of said aperture for positioning of said first and second prism means at an intermediate focus position.

6. A multispectral multidetector imager as recited in claim 5, wherein said aperture means includes an optical window for positioning said first and second prism means at the focal plane of said optical window.

7. A multispectral multidetector imager as recited in claim 6, wherein said second array detector means includes a plurality of band pass detector elements deposited on the front surface of said detector substrate.

8. A multispectral multidetector imager as recited in claim 7 wherein said first array detector means includes:

a transparent detector substrate having a front surface and a rear surface;

a plurality of optical band pass filters deposited on said rear surface of said detector substrate;

a detector array having a plurality of detector elements operatively on said front surface of said transparent substrate for purpose of rear illumination; and a plurality of doped channel elements intermediate said detector elements.

9. A multispectral multidetector imager as recited in claim 8 wherein said two dimensional spectral filter array means includes a plurality of spectral band pass filters positioned as a staring imager with no scanning of the field of view required to form an image.

10. A multispectral multidetector imager as recited in claim 9 wherein said plurality of band pass spectral filter array means includes a plurality of spectral filter patches position in a pattern wherein every pass band patch has three or more pass bands adjacent to it and no filter patches of the same pass band are adjacent.

11. A multispectral multidetector imager as recited in claim 10, wherein each of said detector elements has a corresponding individual filter pass band patch.

12. The multispectral multidetector imager of claim 11, wherein said filter patches divide the 8–12 micron wavelength band fully into ½ micron wide segments.

13. A multispectral multidetector imager as recited in claim 3 wherein said first and second prism means each include a diagonal face oppositely positioned having a surface roughness of $\lambda/20$ or better; and a diagonal air gap between said first and second diagonal faces of $\lambda/5$ or smaller.

14. A filtered multispectral detector imager, which comprises:

(a) a transparent detector substrate having a front surface and a rear surface;

(b) a plurality of optical band pass filters deposited on said rear surface of said substrate;

(c) a detector array having a plurality of band pass detector elements operatively on said front surface of said transparent substrate for purposes of rear illumination;

(d) a plurality of doped channel elements intermediate said detector elements;

(e) dewar means having an interior chamber, said dewar means maintaining said imager at cryogenic temperatures and providing protection from stray radiation and having aperture means so that a field of radiation can pass therethrough; and (f) wherein said transparent substrate, said filters, said detector array, and said doped channel elements are disposed within said interior chamber of said dewar means so that only radiation passing through said aperture means is detected.

15. The multispectral detector imager of claim 14, wherein said two dimensional spectral filter array means includes a plurality of spectral band pass filters positioned as a staring imager with no scanning of the field of view required to form an image.

16. The multispectral detector imager of claim 15, wherein said plurality of band pass spectral filter array means includes a plurality of spectral filter patches positioned in a pattern wherein every pass band patch has three or more pass bands adjacent to it and no filter patches of the same pass band are adjacent.

17. The multispectral detector imager of claim 16, wherein each of said detector elements has a corresponding individual filter pass band patch.

18. The multispectral detector imager of claim 17, wherein said filter patches divide the 8–12 micron wavelength band fully into ½ micron wide segments.

* * * * *